United States Patent [19]

Hayashida

[11] 4,147,091
[45] Apr. 3, 1979

[54] FLUID PRESSURE SERVOMOTOR

[75] Inventor: Yoshihiro Hayashida, Chigasaki, Japan

[73] Assignee: Tokico Ltd., Kawasaki, Japan

[21] Appl. No.: 834,051

[22] Filed: Sep. 16, 1977

[30] Foreign Application Priority Data

Sep. 20, 1976 [JP] Japan .............................. 51-126438

[51] Int. Cl.² .............................................. F15B 9/10
[52] U.S. Cl. .................................... 91/376 R; 251/322
[58] Field of Search ............. 91/369 A, 369 B, 369 R, 91/376 R; 251/322; 267/179

[56] References Cited

U.S. PATENT DOCUMENTS

| 3,183,789 | 5/1965 | Stelger | 91/369 B |
| 3,209,657 | 10/1965 | Randol | 91/369 B |
| 3,548,718 | 12/1970 | Utton | 91/369 R |

Primary Examiner—Paul E. Maslousky
Attorney, Agent, or Firm—Wenderoth, Lind & Ponack

[57] ABSTRACT

A fluid pressure servomotor has a casing having a movable wall therein dividing the interior of the casing into two chambers, a valve body connected to the movable wall and receiving a valve mechanism communicating one of the chambers selectively with the other chamber or with a source of fluid pressure such as atmospheric pressure, an input rod mounted in the valve body to operate the valve mechanism, and a spring urging the input rod outwardly of the valve body. There is provided a flange portion on the input rod, a spring retaining member having a hole the diameter of which is larger than the flange portion of the input rod and abutted by the spring on one side surface thereof and having a circumferentially extending projection on the other side surface thereof, and a stop ring fitted around the input rod and abutting the inner end of the flange portion of the input rod and the other side surface of the retaining member with the outer circumference thereof being fitted in the inner circumference of the projection.

3 Claims, 8 Drawing Figures

FLUID PRESSURE SERVOMOTOR

BACKGROUND OF THE INVENTION

This invention relates to improvements in fluid pressure servomotors or vacuum boosters for use in vehicle braking systems and, more particularly, to spring retaining devices for use in such servomotors.

The prior art is replete with various types of fluid pressure servomotors including a casing having a movable wall therein dividing the interior of the casing into two chambers, a valve body connected to the movable wall and receiving a valve mechanism therein for connecting one of the chambers selectively with the other chamber or with a source of fluid pressure such as the atmosphere, and an input rod mounted in the valve body to operate the valve mechanism. Usually, the input rod is normally urged by a spring in the direction separating it from the valve mechanism or in the direction projecting outwards of the valve body.

In connecting the spring with the input rod, a radial shoulder has usually been formed on the circumference of the input rod facing toward the inner end thereof to cooperate with a spring retainer abutted by the outer end of the spring. Such construction operates satisfactorily, but it has sometimes been required to exchange the spring or a valve member (usually formed of resilient material) of the valve mechanism or to extract the same outwards of the valve body with the input rod being located in its position. One prior art construction connecting the spring releasably with the input rod comprises an annular flange or an increased diameter portion formed on the input rod to define an inwardly facing shoulder, an annular spring retainer having an inner diameter larger than the outer diameter of the input rod, and a stop ring disposed between the retainer and the shoulder of the input rod. The spring retainer and the spring can easily be removed from the input rod over the outer end thereof. However since the inner diameter of the retainer is sufficiently larger than the corresponding outer diameter of the input rod, it has been difficult to maintain the retainer coaxially with the input rod thus preventing proper operation of the spring and causing undesirable wear of seal members.

SUMMARY OF THE INVENTION

According to the present invention, in a fluid pressure servomotor or a vacuum booster comprising a casing having a movable wall therein dividing the interior of the casing into two chambers, a valve body connected to the movable wall and receiving a valve mechanism which connects one of the chambers selectively with the other chamber or with a source of fluid pressure such as an atmospheric pressure, and an input rod mounted in the valve body to operate the valve mechanism, there is provided a flange portion formed on the outer circumference of the input rod, an annular spring retaining member having an inner diameter larger than the outer diameter of the flange portion of the input rod, a stop ring retaining the annular retaining member on the flange portion of the input rod with the inner diameter thereof snugly fitting the outer diameter of the input rod adjacent to and inwardly of the flange portion thereof, and a projecting portion on the spring retaining member with the radially inner end thereof being adapted to engage with the outer circumference of the stop ring to restrict relative radial movement thereof.

Some embodiments of the present invention will now be described with reference to the accompanying drawings.

BRIEF DESCRIPTION OF THE DRAWINGS

FIG. 4b is a perspective view of a stop ring having a shape for cooperating with the retaining member of FIG. 4a;

DESCRIPTION OF THE EMBODIMENTS

Figure 1:
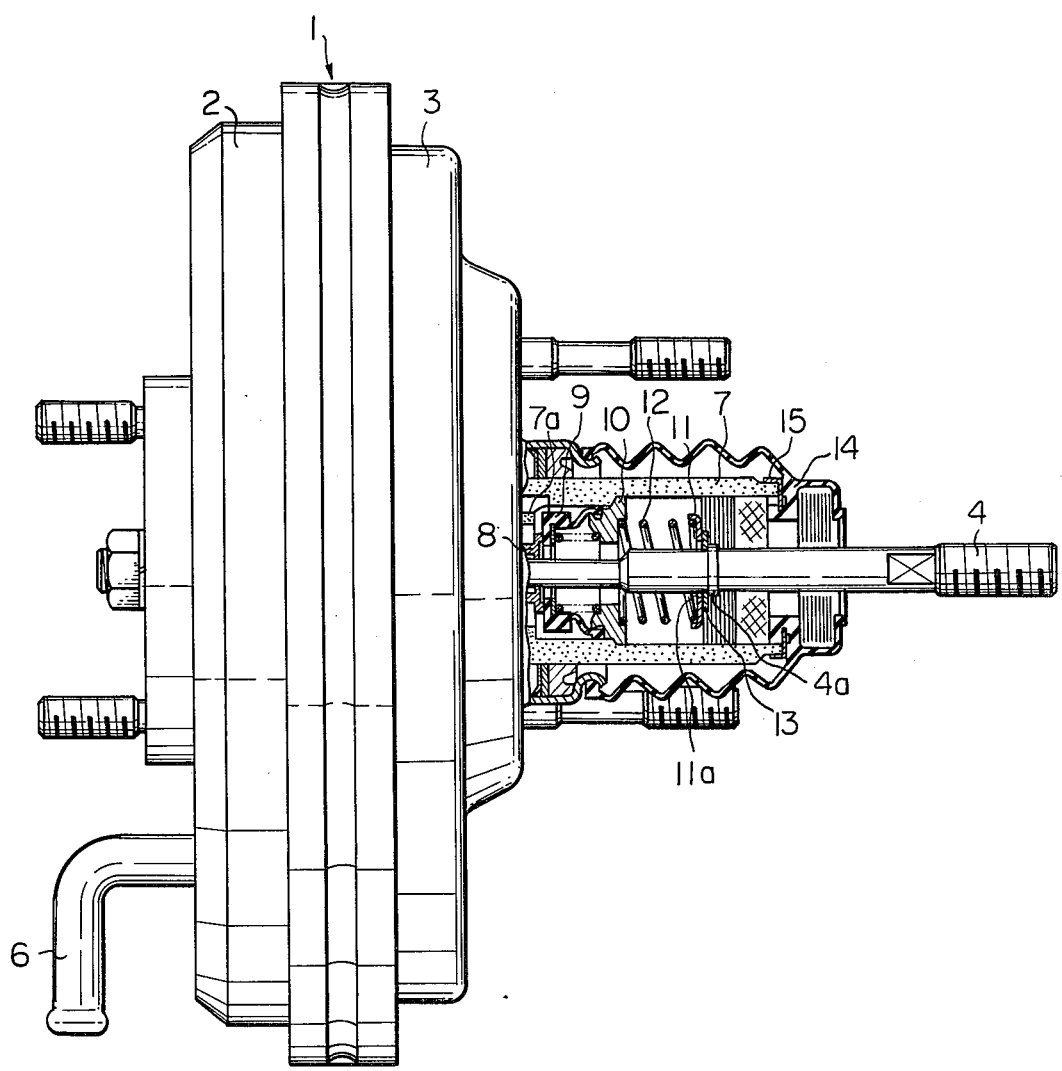
FIG. 1 is a partially cross-sectional view of a prior art vacuum booster.

Referring particularly to FIG. 1, there is shown a fluid pressure servomotor or a vacuum booster according to the prior art which comprises a casing or a shell body 1 consisting of a front shell 2 and a rear shell 3 connected one another to form a sealed container. A flexible diaphragm (not shown) extends across the casing 1 to define a front chamber and a rear chamber (not shown) therein. The diaphragm receives differential pressure acting thereacross so that an increased force is generated in an output rod (not shown) with an input force being transmitted through an input rod 4. The outer end (rightside end in the drawing) of the input rod is connected to an element such as a brake pedal or the like and the inner end of the input rod 4 is connected to the flexible diaphragm through a valve mechanism which normally connects the rear chamber with the front chamber and disconnects the communication between the rear chamber and the atmosphere. The valve mechanism acts to separate the rear chamber from the front chamber which is connected permanently with a source of vacuum pressure such as an intake manifold of an engine (not shown) through a pipe 6 and introduce atmospheric air into the rear chamber to generate a differential pressure across the diaphragm when the input rod 4 is moved inwardly.

The inner end of the input rod 4 is connected to a plunger 8 which is fitted slidably in a cylinder portion 7a of a generally cylindrical valve body 7 the inner end of which is secured to the flexible diaphragm and a piston plate (not shown) extending generally along one side of the diaphragm. The valve body 7 may be formed integrally with the piston plate. The vacuum booster having the construction described as above is well known to public and is shown in U.S. Pat. Nos. 3,628,422 and 3,981,227.

Figure 2:
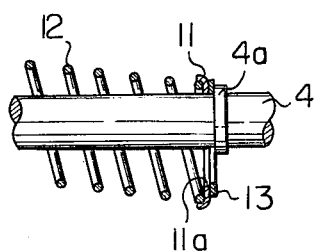
FIG. 2 is a partial view of parts of the vacuum booster of FIG. 1.

A seal member 9 acting as a valve member of the valve mechanism is retained by a seal retainer 10 on the inner diameter of the valve body 7, and a spring 12 is arranged between the seal retainer 10 and a spring retaining member 11 fitted on the input rod 4 to urge the input rod 4 in the rightward direction. In order to assemble or disassemble the spring 12 easily in its position, a flange portion 4a having an outer diameter smaller than the inner diameter of the spring retaining member 11 is formed on the input rod 4, and a stop ring 13 is mounted between a radial shoulder defined on the inner end of the flange portion 4a of the input rod 4 and the spring retaining member 11. Such construction is convenient for adjusting or changing the spring force of the spring 12 so as to satisfy the requirements of the vehicle on which the vacuum booster is mounted. However, there has sometimes been experienced misalignment, as shown in FIG. 2, between the spring retaining member 11 and the input rod 4 since the diameter of a hole 11a formed in the spring retaining member 11 is substantially larger than the diameter of the input rod 4 substantially. When the retaining member 11 moves radially with respect to the input rod 4, an eccentric load is applied to the valve body 7 through the seal retainer 10 which may cause improper seating of the seal member 9 on the valve seat portion of the valve mechanism formed in the valve body 7. Such improper seating of the seal member 9 will be particularly observed in a balanced condition of the vacuum booster in which the rear chamber is separated from the atmosphere by engagement of the seal member 9 with the plunger 8 and also from the front chamber by engagement of the seal member with the valve seat portion of the valve body 7. Shown at 14 in FIG. 1 is a dust preventing boot covering the outer end of the valve body 7 and at 15 is a retainer for retaining the boot 14 on the valve body 7.

Figure 3:
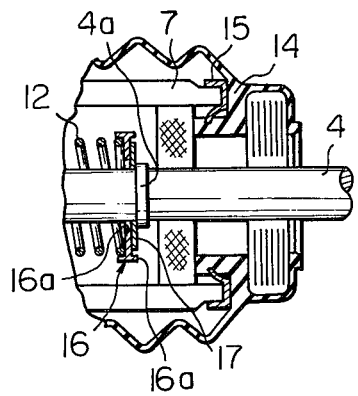
FIG. 3 is a partial cross-sectional view of a vacuum booster according to the present invention.
Figure 4A:
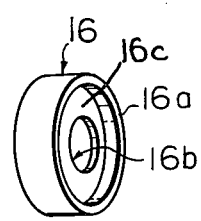
FIG. 4a is a perspective view of a retaining member according to the present invention.
Figure 4B:

The present invention has an object preventing the shortcomings just described and one embodiment of the present invention is shown in FIGS. 3, 4a and 4b. According to the present invention, the spring retaining member 11 in FIG. 1 is replaced by a spring retaining member 16 having a hole 16b the diameter of which is larger than the flange portion 4a of the input rod 4, a radially extending annular portion 16c and an annular or circumferentially extending projection 16a at the outer end of the annular portion 16c on one side (the rightside in the drawing) thereof for cooperating with a stop ring 17. The stop ring 17 has an inner diameter nearly equal to the outer diameter of the input rod 4 and an outer diameter adapted to fit or engage with the inner diameter of the projection 16a of the spring retaining member 16 so as to restrict excess movement of the stop ring 17 in the radial direction relative to the member 16. Thus, it is very easy to assemble the spring 12 with the input rod 4, by inserting the spring 12 and the spring retaining member 16 from the outer end of the input rod 4 with the flange portion 4a of the input rod 4 passing through the hole 16b of the member 16, and fitting the stop ring 17 around the input rod 4 and the member 16 by compressing the spring 12.

Figure 5:
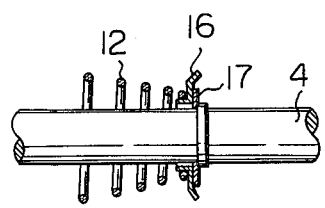
FIG. 5 is a view similar to FIG. 2 but showing a modified form of the present invention.
Figure 6:
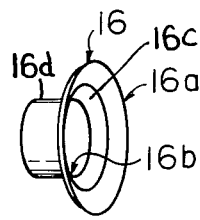
FIG. 6 is a perspective view showing a modified form of the retaining member with which the stop ring of FIG. 4b can be incorporated in FIG. 5.

FIGS. 5 and 6 show another embodiment of the present invention, in which the same numerals have been applied to parts corresponding to the first embodiment. The spring retaining member 16 is a pressed member with an axially extending flange portion 16d defining inner diameter 16b and, an angularly extending flange portion on the outer circumferencial portion inclined away from the radially extending flange portion 16c to define the projection 16a cooperable with the stop ring 17 of FIG. 4b.

According to the present invention having the construction as described, misalignment or undesirable radial movement of the spring retaining member can effectively be prevented and thus the sealing characteristics of the valve mechanism can be maintained. Further the stop ring is located inside of the projection of the spring retaining member thus preventing expansion of the stop ring and consequent falling-off thereof. It has a very simple in construction and, moreover, it is very easy to exchange parts including the spring 12 and the seal member 9.

I claim:

1. In a fluid pressure servomotor having a casing with a movable wall therein dividing the interior of the casing into two chambers, a valve body connected to the movable wall and having a valve mechanism which communicates one of the chambers selectively with the other chamber or with a source of fluid pressure such as atmospheric pressure, an input rod mounted in the valve body to operate the valve mechanism, and a spring urging the input rod outwardly of the valve body, the improvement comprising a flange portion on the input rod, an annular spring retaining member around said input rod with said spring abutting the surface on one side thereof and the inner diameter of which is larger than the outer diameter of the flange portion of the input rod and having a circumferentially extending projection projecting from the surface on the other side of the retaining member, and a stop ring fitted onto the input rod and positioned between the flange portion of the input rod and the surface on the other side of the retaining member with the outer circumference thereof fitted in the inner circumference of said projection.

2. The improvement as claimed in claim 1 wherein the spring retaining member further has an axially extending annular flange portion extending from said one side and having an inner diameter the same as the diameter of the inner diameter of said annular spring retaining member, said spring retaining member having a radially extending annular portion extending integrally from one end of the annular flange portion, and said circumferentially extending projection being an outer flange portion extending integrally from the outer circumference of the radially extending annular portion and inclined in a direction away from said annular flange portion.

3. The improvement as claimed in claim 1 in which said spring retaining member has a radially extending annular flange portion and said circumferentially extending projection being on the outer periphery of said radially extending annular flange portion and extending axially of said spring retaining member.

* * * * *